Patented Dec. 2, 1924.

1,518,044

UNITED STATES PATENT OFFICE.

WILLARD N. BASCOM, OF BRONXVILLE, NEW YORK.

LIQUID-DISTRIBUTING COMPOSITION.

No Drawing.    Application filed November 22, 1923.  Serial No. 676,394.

*To all whom it may concern:*

Be it known that I, WILLARD N. BASCOM, a citizen of the United States, and a resident of Bronxville, in the county of Westchester and State of New York, have invented a new and Improved Liquid-Distributing Composition, of which the following is a full, clear, and exact description.

This invention has relation to compositions for distributing liquids over the surface of windows or other surfaces upon which the liquid ordinarily separates into globules.

The outstanding object of the present invention is to provide a composition which is especially designed for application to glass wind shields, windows of vehicles, or the like, in order to neutralize the globular formation of water or other liquid thereon and thus effect an even distribution of the water or liquid thereover whereby to prevent impairing or obscuring of the vision therethrough.

As a further object the invention contemplates a composition which is comparatively simple and inexpensive to produce and which will not soil or harm the finish of a vehicle or the clothing.

With the above recited and other objects in view, the invention resides in the novel combination of ingredients set forth in the following specification and particularly pointed out in the appended claims.

The composition constituting the invention consists of sugar and slippery elm bark, the same being preferably mixed in a powdered form and preferably of substantially equal parts. If desired, a suitable substance may be added thereto for the purpose of preventing souring of the ingredients, which substance may consist of salicylic acid or any other equivalent substance. The composition may be used in either powdered, solid, liquid or paste form. In its liquid form a suitable solvent is mixed therewith, preferably distilled water, to the appropriate amount to produce a liquid of the desired consistency. In paste form the amount of liquid will be obviously reduced, while in solid or cake form, any suitable substance may be added to cause the elements to adhere together. Where the device is used for the wind shield or windows of vehicles upon which sliding or swinging cleaning devices are mounted, the composition in a solid form may be cut into strips and inserted in the place ordinarily occupied by the squeegee. When used in powdered form, after the rain or snow collects on the wind shield, the powder is dusted on the same and wiped evenly over the surface. In any event after the composition has been distributed over the surface of the window, the same prevents the formation of globules and effects an even distribution of the water or liquid over the surface whereby vision therethrough is unimpaired. The nature of the composition is such that there is no danger of soiling or harming either the finish of a vehicle or the clothing of the person using the same, while the composition is non-poisonous and does not stain. It is of course to be understood that the composition may be impregnated either thoroughly, partially, or superficially with woven or knitted fabric, leather, felt or other material whereby it may be expediently or conveniently applied.

I claim:

1. A composition for distributing liquid over a surface to prevent the globular formation of the same thereon, comprising a mixture of sugar and slippery elm bark.

2. A composition for distributing liquid over a surface to prevent the globular formation of the same thereon, comprising a mixture of powered sugar and powdered slippery elm bark, in substantially equal parts.

3. A composition for distributing liquid over a surface to prevent the globular formation of the same thereon, comprising a mixture of powdered sugar, powdered slippery elm bark, a liquid solvent and a substance for preventing souring of the mixture.

4. A composition for distributing liquid over a surface to prevent the globular formation of the same thereon, comprising a mixture of powdered sugar, powdered slippery elm bark, a liquid solvent and a quantity of salicylic acid to prevent souring thereof.

5. A composition for distributing liquid over a surface to prevent the globular formation of the same thereon consisting of a mixture of sugar, slippery elm bark and distilled water.

WILLARD N. BASCOM.